United States Patent

[11] 3,591,007

| [72] | Inventor | Harold Crowther |
| | | Solihull, England |
| [21] | Appl. No. | 807,498 |
| [22] | Filed | Mar. 17, 1969 |
| [45] | Patented | July 6, 1971 |
| [73] | Assignee | Joseph Lucas Industries Limited |
| | | Birmingham, England |

[54] LIQUID FILTERING EQUIPMENT
16 Claims, 3 Drawing Figs.

| [52] | U.S. Cl. | 210/234, |
| | | 210/235, 210/249, 210/304, 210/456 |
| [51] | Int. Cl. | B01d 35/02, |
| | | B01d 29/42 |
| [50] | Field of Search | 210/134, |
| | | 136, 232, 234, 235, 249, 304, 306, 311, 456, 512, |
| | | 453, 451 |

[56] References Cited
UNITED STATES PATENTS

| 1,107,485 | 8/1914 | Bowser | 210/304 |
| 2,106,218 | 1/1938 | Krieck | 210/249 X |
| 2,170,074 | 8/1939 | Hewitt | 210/304 X |
| 2,511,800 | 6/1950 | Wilkinson | 210/249 |
| 3,034,647 | 5/1962 | Giesse | 210/512 X |

*Primary Examiner*—Frank A. Spear, Jr.
*Attorney*—Holman, Glascock, Downing and Seebold ABSTRACT: A liquid filtering equipment has a body and a lid which respectively include an inlet and an outlet for the fluid to be filtered. A filter element is supported within the body between the inlet and the outlet. The body and lid together may be mounted in a support which also forms part of the equipment and which includes inlet and outlet passages with which the inlet and outlet in the body and lid respectively align. The body and lid may thus be removed as a unit from the support without disturbing the filter element.

LIQUID FILTERING EQUIPMENT

This invention relates to liquid filtering equipment and has as an object to provide such equipment in a convenient form.

Liquid filtering equipment in accordance with the invention comprises a cup-shaped housing with a groove formed around the interior of the mouth thereof and an inlet for liquid to be filtered opening tangentially into said groove, a lid for the housing formed with a liquid outlet, a sleeve within the housing for diverting liquid entering the housing towards the closed end thereof before passing through a filter element mounted within the sleeve to the outlet, and a baffle ring mounted externally of said sleeve and covering said groove, said baffle ring having formed therein a plurality of spaced ports, whereby, in use the liquid is caused to enter the annular space between the housing and the sleeve at a plurality of spaced positions around the periphery thereof.

Figure 1:
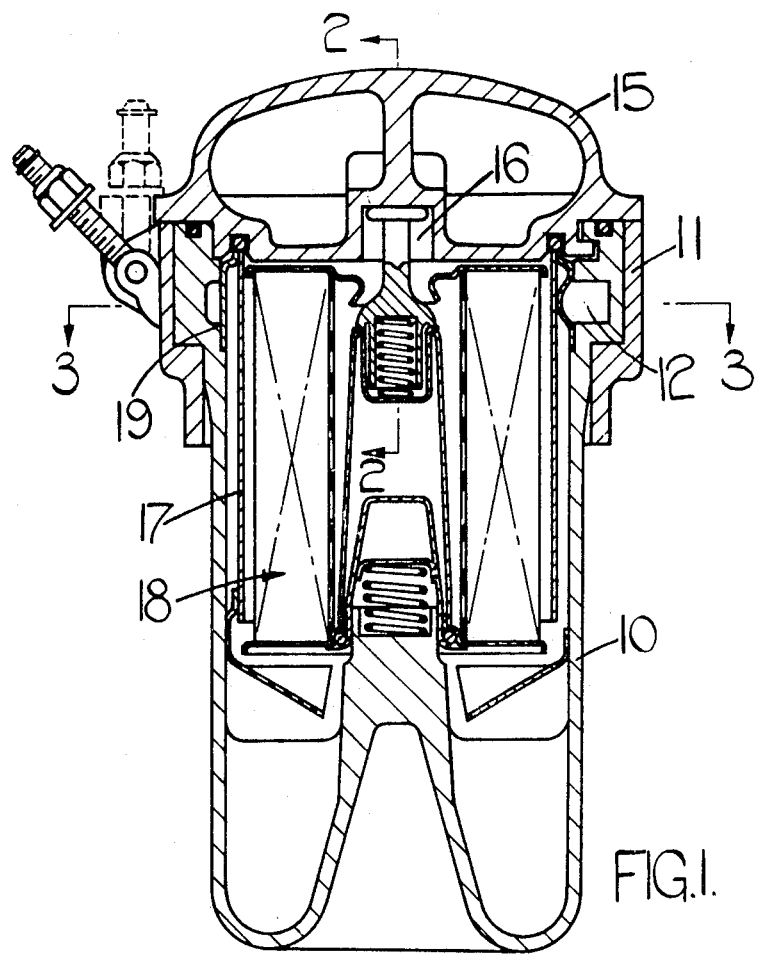
FIG. 1 is an axial section through an example of liquid filtering equipment in accordance with the invention.
Figure 2:
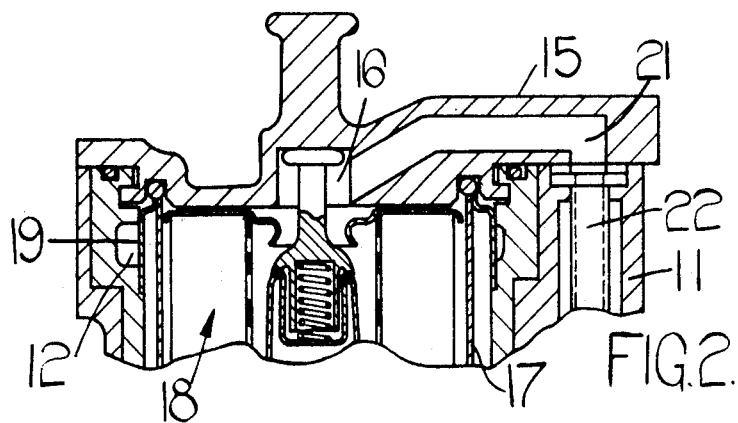
FIG. 2 is a fragmentary section on line 2-2 in FIG. 1.
Figure 3:
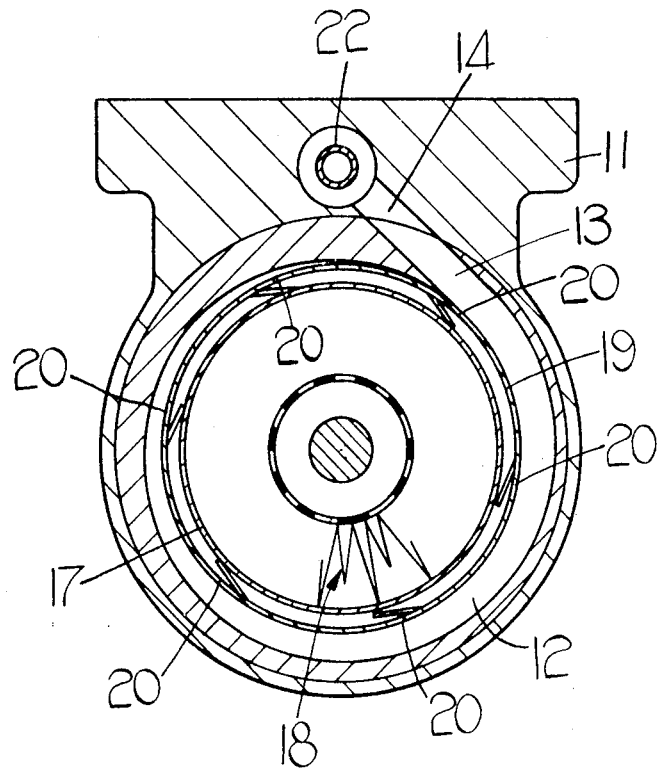
FIG. 3 is a section on line 3-3 in FIG. 1.

The filtering equipment shown is substantially identical to a filtering equipment described by way of example in our copending application Ser. No. 807,497, filed Mar. 17, 1969, and includes a housing 10 fitted within an outer casing, a part 11 of which is shown. The housing is of generally cup-shaped form with an internal groove 12 adjacent the mouth thereof. This groove communicates with a tangential inlet 13 in the wall of housing 10, which inlet in turn communicates with an inlet passage 14 in the casing 11. The groove 12 is of volute form, tapering in a direction away from the inlet 13 until it disappears completely in one complete revolution around the interior of the housing.

The housing 10 has a lid 15 which fits sealingly in the mouth of the housing 10. The lid 15 has a central liquid outlet 16 through which filtered liquid leaves the housing via an outlet port 21 and an aligned outlet passage 22 in the casing 11. There is a cylindrical sleeve 17 fitted within the housing 10 surrounding the filter element 18. The sleeve sealingly engages the lid 15.

A baffle ring 19 is fixed around the sleeve 17 and engages the housing above and below the groove 12. The ring 19 has a plurality of spaced ports 20 formed by making axial slits in the ring 19 and depressing areas of the ring on one side of each such slit.

In use liquid entering the groove 12 is distributed from the groove 12 into the annular space between the sleeve 17 and the housing 10. The discrete jets of liquid entering this space through the ports 20 give rise to a very strong swirling motion of the liquid as it passes down the annular space towards the closed end of the housing. During this motion any heavy particles are thrown against the wall of the housing by centrifugal action and are therefore separated from the liquid stream which passes around the lower end of the sleeve 17. The separation of these heavy particles is effected more completely than in a conventional filter with a simple volute entry without a baffle ring. Thus the life of the filter element is increased since there are fewer heavy particles escaping centrifugal separation.

Having thus described our invention what We claim as new and desire to secure by Letters Patent is:

1. Liquid filtering equipment comprising a cup-shaped housing with a groove formed around the interior of the mouth thereof and an inlet for liquid to be filtered opening tangentially into said groove, a lid for the housing formed with a liquid outlet, a sleeve within the housing for diverting liquid entering the housing towards the closed end thereof before passing through a filter element mounted within the sleeve to the outlet, and a baffle ring mounted externally of said sleeve and covering said groove, said baffle ring having formed therein a plurality of spaced ports, whereby, in use the liquid is caused to enter the annular space between the housing and the sleeve at a plurality of spaced positions around the periphery thereof.

2. Liquid filtering equipment as claimed in claim 1 in which the said ports are formed by making slits in the baffle ring and depressing areas of the ring on one side of each such slit.

3. Liquid filtering equipment as claimed in claim 1 in which the lid is engaged with the housing by means of a bayonet-type fastening.

4. Liquid filtering equipment as claimed in claim 1 in which the groove is of volute form.

5. Liquid filtering equipment as claimed in claim 4 in which the depth of the groove reduces away from the inlet and disappears in substantially one revolution around the housing.

6. Liquid filtering equipment as claimed in claim 1 in which the filter element comprises a perforated sleeve having flanges at the ends thereof which support an annular paper filter.

7. Liquid filtering equipment as claimed in claim 6 in which a mounting for the filter element comprises a spring-loaded locating member having a flange which sealingly engages one of the flanges of the filter element and urges the other flange of the filter element into sealing engagement with the lid.

8. Liquid filtering equipment as claimed in claim 1 in which the housing is supported within an outer casing.

9. Liquid filtering equipment as claimed in claim 8 in which the liquid inlet communicates with an aligned passage in the casing.

10. Liquid filtering equipment as claimed in claim 8 in which the liquid outlet communicates with an aligned passage in the casing.

11. Liquid filtering equipment as claimed in claim 8 which includes means for securing the housing within the casing.

12. Liquid filtering equipment as claimed in claim 8 in which the securing means includes a plurality of threaded latch members pivotally mounted on the casing and having nuts engageable with the lid.

13. Liquid filtering equipment as claimed in claim 1 which includes a valve means between the filter element and the fluid outlet, said valve means including a seating and a closure member.

14. Liquid filtering equipment as claimed in claim 13 in which the valve means is automatically closed when the lid is removed from the housing.

15. Liquid filtering equipment as claimed in claim 14 in which the valve seating forms part of the filter element.

16. Liquid filtering equipment as claimed in claim 15 in which the closure member is carried by the filter element.